United States Patent
Jean et al.

(10) Patent No.: US 11,530,932 B2
(45) Date of Patent: Dec. 20, 2022

(54) METHOD OF CHARACTERIZING THE CONDITION OF A ROAD

(71) Applicant: IFP Energies nouvelles, Rueil-Malmaison (FR)

(72) Inventors: Maxime Jean, Rueil-Malmaison (FR); Alexandre Chasse, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 147 days.

(21) Appl. No.: 16/913,733

(22) Filed: Jun. 26, 2020

(65) Prior Publication Data
US 2020/0408561 A1  Dec. 31, 2020

(30) Foreign Application Priority Data

Jun. 28, 2019 (FR) ..................................... 19/07.076

(51) Int. Cl.
| | | |
|---|---|---|
| *G06F 3/048* | (2013.01) | |
| *G01C 21/36* | (2006.01) | |
| *G01S 19/42* | (2010.01) | |

(52) U.S. Cl.
CPC ..... *G01C 21/3694* (2013.01); *G01C 21/3664* (2013.01); *G01C 21/3667* (2013.01); *G01S 19/42* (2013.01)

(58) Field of Classification Search
CPC ............. G01S 21/3694; G01S 21/3664; G01S 21/3667; G01S 19/42
See application file for complete search history.

(56) References Cited

U.S. PATENT DOCUMENTS

| | | | |
|---|---|---|---|
| 9,108,640 B2 | 8/2015 | Jackson | |
| 10,278,039 B1* | 4/2019 | Matus | ...................... H04W 4/40 |
| 10,789,660 B1* | 9/2020 | Schmidt | ............... G06Q 50/163 |
| 10,890,925 B2* | 1/2021 | Leonard | ................. G07C 5/008 |
| 2011/0173039 A1* | 7/2011 | Villalobos | .............. G01C 21/00 |
| | | | 705/7.12 |
| 2012/0053805 A1 | 3/2012 | Dantu | |
| 2012/0197587 A1* | 8/2012 | Luk | ...................... B60W 40/09 |
| | | | 702/141 |
| 2016/0245648 A1 | 8/2016 | Tani et al. | |

(Continued)

FOREIGN PATENT DOCUMENTS

| | | |
|---|---|---|
| JP | 2017-223640 A1 | 12/2017 |
| WO | 2017/208264 A1 | 12/2017 |

OTHER PUBLICATIONS

Preliminary Search Report for FR 19/07.076, dated Apr. 1, 2020 (2 pages).

(Continued)

*Primary Examiner* — David Phantana-angkool
(74) *Attorney, Agent, or Firm* — Fitch, Even, Tabin & Flannery LLP

(57) ABSTRACT

The invention is a method of characterizing a road for at least one route travelled by at least one road user, with sensors: a three-axis accelerometer (ACC) and a geolocation sensor (GPS). The method comprises a measurement step (MES), a measurement processing step for disregarding (AFF) the effects related to the road user's speed in order to determine vibrations due to the road roughness, and an analysis of the vibrations to characterize (CAR) the condition of the road.

11 Claims, 5 Drawing Sheets

(56) References Cited

U.S. PATENT DOCUMENTS

| | | |
|---|---|---|
| 2017/0167088 A1 | 6/2017 | Walker et al. |
| 2018/0024562 A1* | 1/2018 | Bellaiche ............... G06T 7/73 701/26 |
| 2018/0105206 A1 | 4/2018 | Gullven et al. |
| 2018/0154908 A1* | 6/2018 | Chen ................ G07C 5/0858 |
| 2020/0408561 A1* | 12/2020 | Jean ................ G01C 21/3664 |

OTHER PUBLICATIONS

Giacomo Alessandroni et al: "A Study on the Influence of Speed on Road Roughness Sensing: The SmartRoadSense Case", Sensors, vol. 17, No. 2, Feb. 7, 2017 (Feb. 7, 2017), p. 305, XP55681383.

* cited by examiner

[Fig 1]
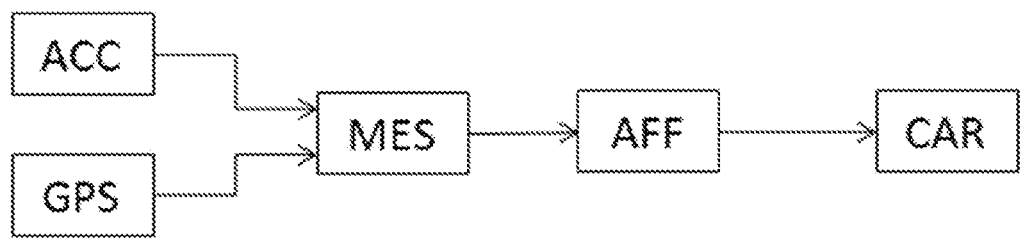
[Fig 2]
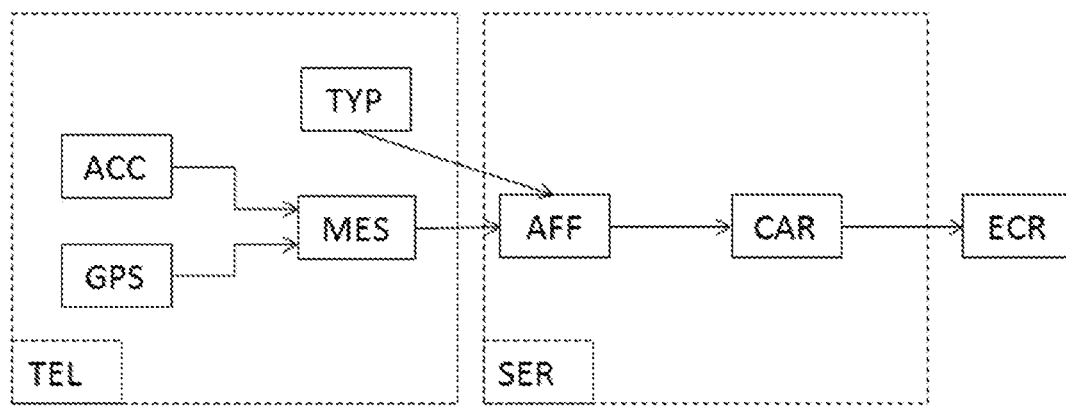
[Fig 3]
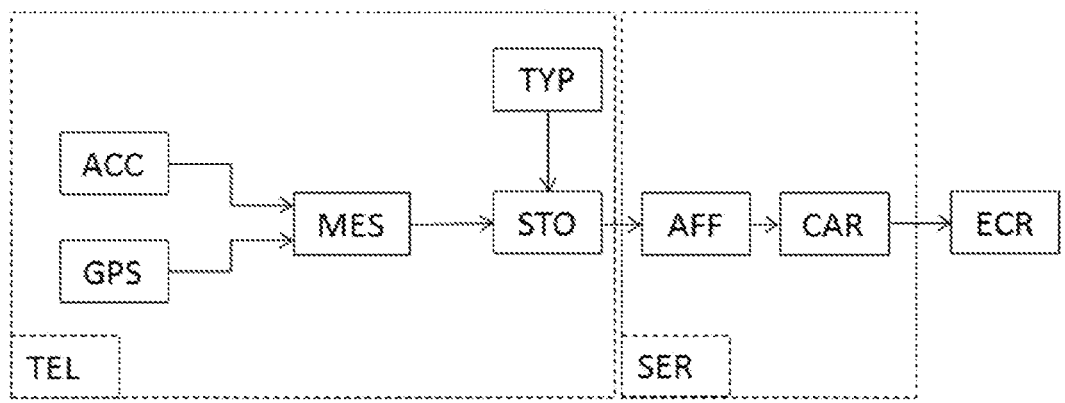

[Fig 4]
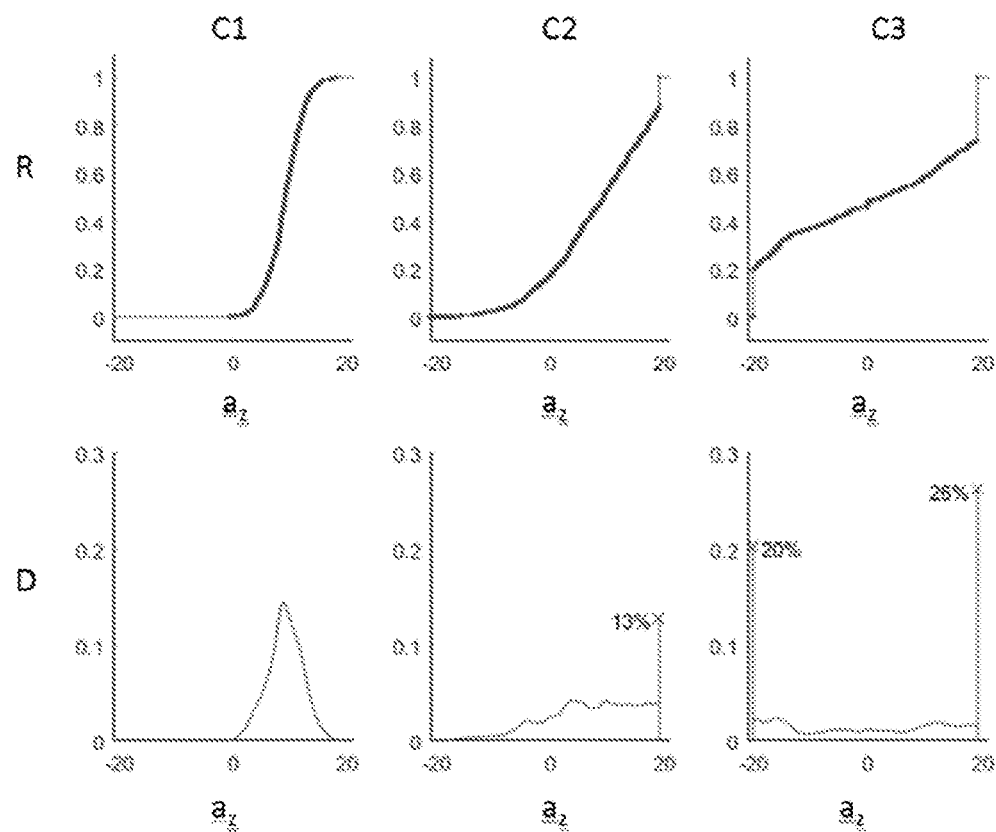

[Fig 5]
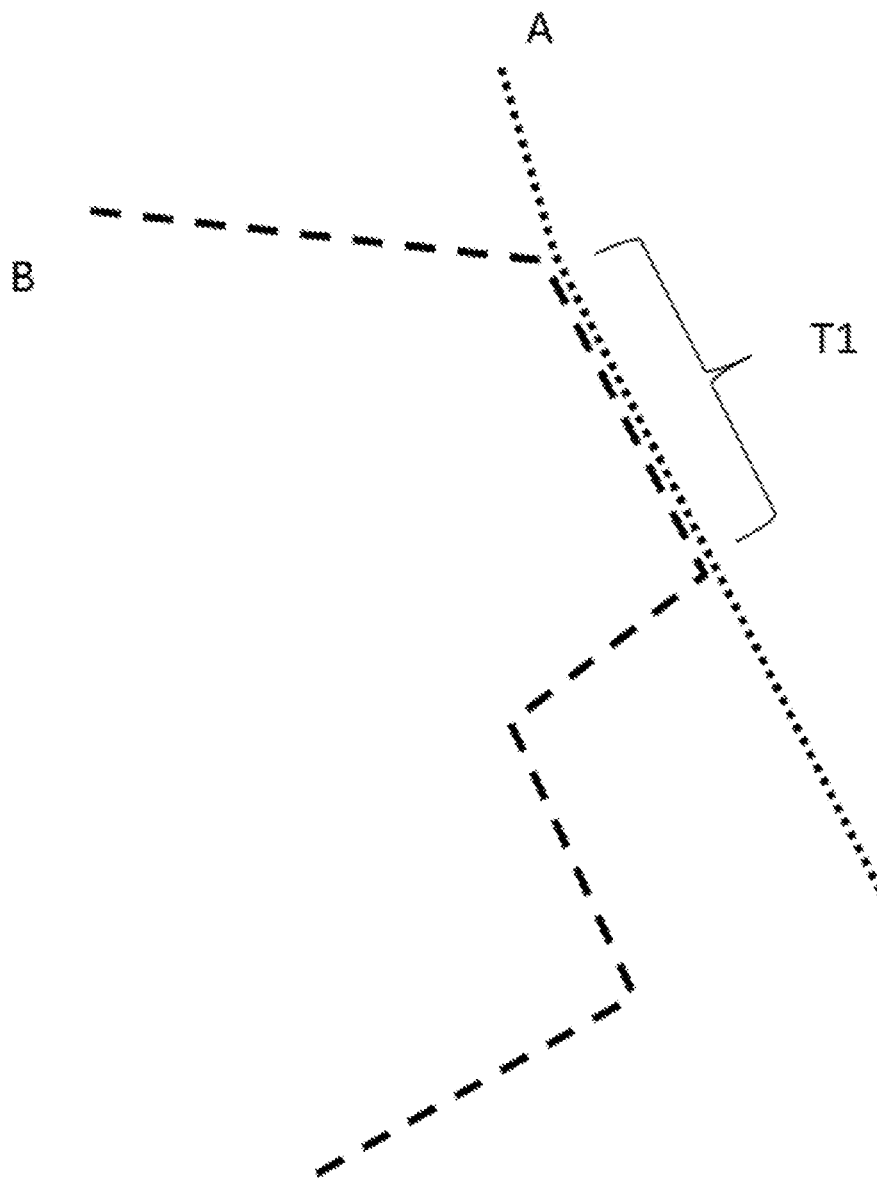

[Fig 6]
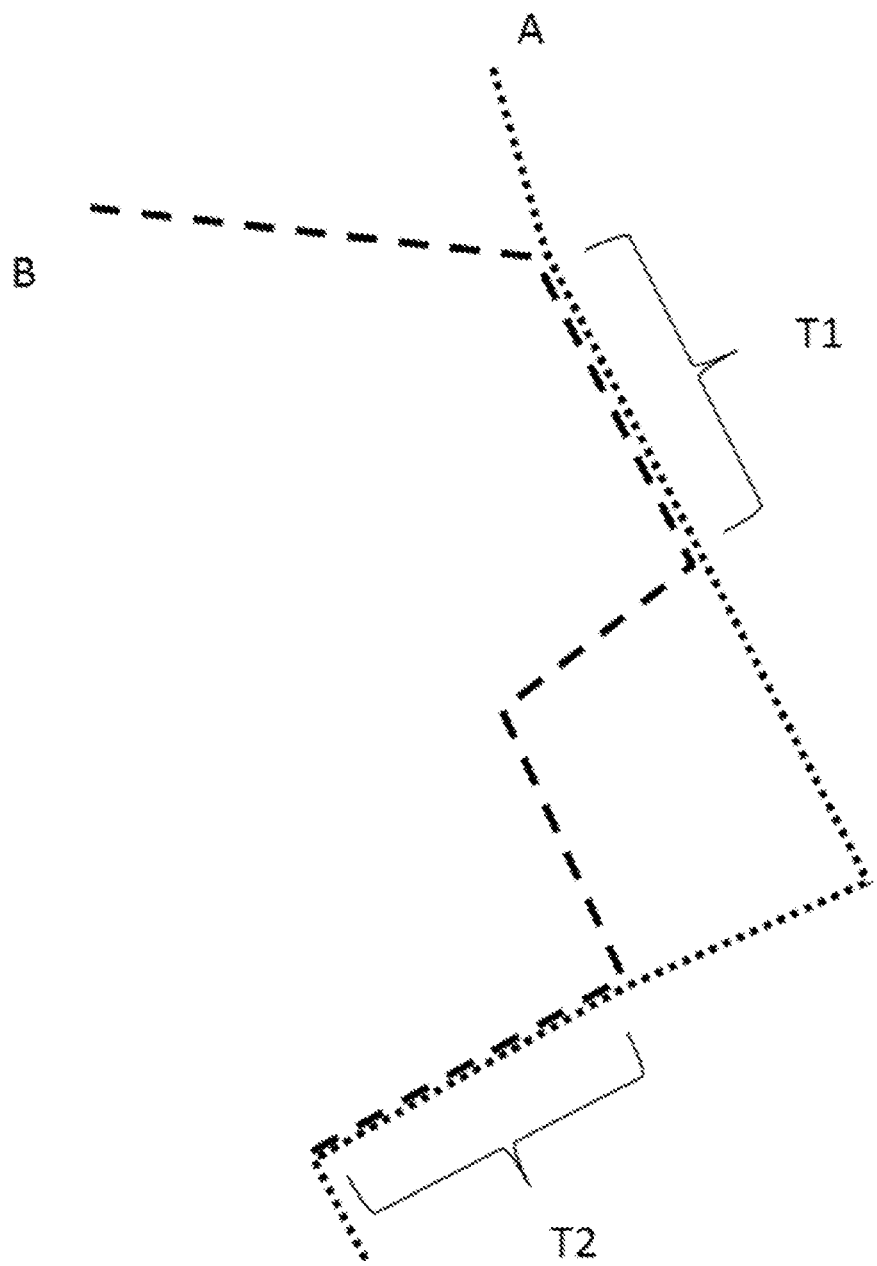

[Fig 7]
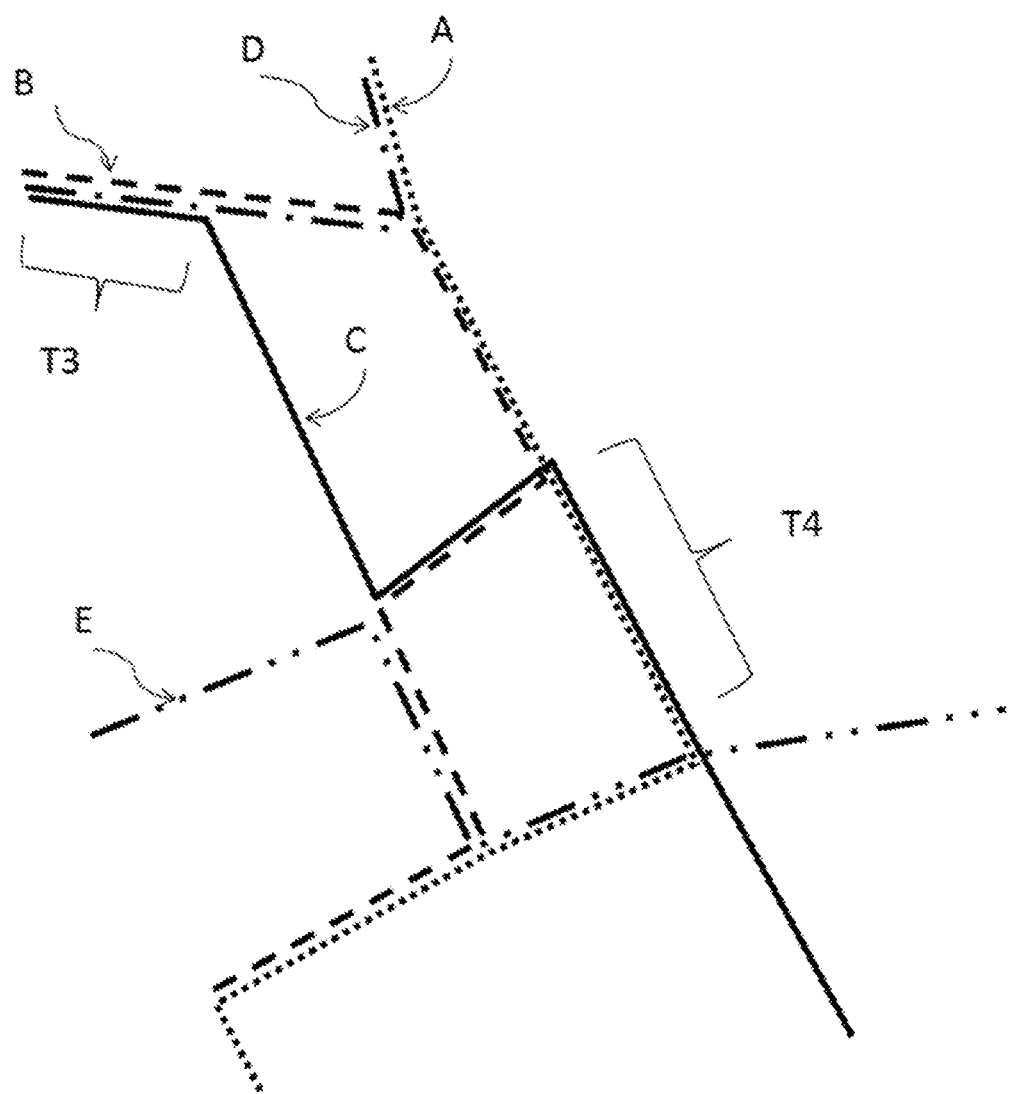

METHOD OF CHARACTERIZING THE CONDITION OF A ROAD

CROSS-REFERENCE TO RELATED APPLICATION

Reference is made to French Patent Application No. 19/07.076, filed Jun. 28, 2019, the contents of which are incorporated herein by reference in their entirety.

BACKGROUND OF THE INVENTION

Field of the Invention

The present invention concerns the characterization of the condition of a road.

Description of the Prior Art

Roads may exhibit roughness, which may be due in some cases to degradations such as holes, potholes, bumps, etc., and in others to the construction of the road: paving stones, road markings, etc. This roughness has a strong impact on the road users' comfort and safety, in particular for bicycles.

For these road users, it is then useful to determine which are the most comfortable and safest roads so as to adapt their route.

For the public authorities (road maintenance manager for example) and public works companies, it is also useful to monitor the condition of the roads and, if need be, to plan repair and/or maintenance works. In such a case, the information relative to road characterization can be related to information relative to the road traffic.

Only two solutions for monitoring the quality level of the road network are currently available which are qualitative records or quantitative records. Qualitative records are provided by officers specifically assigned to this task or by spontaneous feedback shared by users affected by the road condition. Quantitative records are costly, infrequent, limited in space and complex to interpret. These quantitative records may notably be made using a truck equipped with at least one of physical quantity sensors and cameras directed towards the road. Such records are therefore spot checks and the monitoring frequency is low.

U.S. Pat. No. 9,108,640 describes a method of monitoring the quality level of the road. This method is suited only for motor vehicles and it is complex to implement because connection to the car's computer is required. Furthermore, it is a sequential approach which requires a sensor which can optionally be calibrated according to the community's average measurements prior to sending its measurements and integrating them into the overall average. The result is that the order of the routes is taken into account in this sequential approach, which makes it an approach that is neither very general, nor very robust.

US published patent application 2017/0,167,088 describes a method of determining the road quality through an analysis related to the suspension system of vehicles. Thus, road quality determination requires precise sensors arranged directly on the vehicle. This method therefore is dependent on the vehicle and it is difficult to adapt for a bicycle.

US published patent application 2018/0,105,206 describes a method of determining road properties notably by use of the wheel speed, of speed and acceleration measurements, and steering rack force measurements. Thus, road quality determination requires many precise sensors arranged directly on the vehicle. This method therefore is dependent on the vehicle and it cannot be adapted for a bicycle.

Patent application WO-2017/208,264 describes a system for measuring the road condition. This system seems specific to motor vehicles and it does not allow an application for any other type of road user, such as bicycles or motorized two-wheelers.

SUMMARY OF THE INVENTION

The invention avoids bias related to qualitative records while providing a quantified, objective, exhaustive, dynamic, robust and inexpensive road qualification suited to all types of road users. The invention therefore relates to a method of characterizing a road for at least one route travelled by at least one road user, by using along the route simple and widespread sensors which are a three-axis accelerometer and a geolocation sensor. The method comprises a measurement step, a measurement processing step for disregarding the effects related to the road user's speed in order to determine the vibrations due to the road roughness, and an analysis of the determined vibrations to characterize the condition of the road.

The invention relates to a method of characterizing the condition of a road along a route travelled by a user of the road using a vehicle, by use of a three-axis representing roughness of the route accelerometer and a geolocation sensor. The following steps are carried out for this method:
  a) along the route, measuring the acceleration of the road user along the three axes by use of the three-axis accelerometer, and measuring the position and the speed of the road user by use of a geolocation sensor;
  b) determining vibrations generated by the roughness of the road, which disregards the acceleration measurements, based on the effect of the travel speed of the road user as follows:
    i) when the road user uses a bicycle, determining the vibrations by use of the acceleration measurements for a predetermined speed range;
    ii) when the road user uses a motor vehicle or a motorized two-wheeler, determining the vibrations by dividing the acceleration measurements by a baseline that is a function of the speed of the road user; and
  c) characterizing the condition of the road by an analysis of the determined vibrations.

According to an embodiment, the three-axis accelerometer and the geolocation sensor are integrated in a smartphone.

Advantageously, the predetermined speed range is between 15 and 30 km/h and is preferably between 16 and 26 km/h.

Advantageously, the baseline is obtained by use of the measurements of the route travelled by the road user.

According to an implementation, the road condition is characterized by road sections of the route.

According to an aspect, the road condition is characterized by a distribution of the determined vibrations on each road section of the route.

According to an embodiment, steps a) and b) are repeated for at least one of routes and users of the road. For each common road section travelled, the road condition is characterized by comprising the determined vibrations for the routes.

Advantageously, the determination of vibrations is performed through calibration of the routes. Preferably the calibration of the routes is a method of symmetric optimization in chronological order of travel of the routes.

According to a feature, the measurements are stored in a database.

Advantageously, the measurements are stored by measurement aggregation for a predetermined time window, with the predetermined time window preferably ranging between 0.05 s and 0.25 s.

Preferably, the data collected in the predetermined time window comprises at least one component which is a vibration component corresponding to the sum of the three variances of the acceleration measurement on the three axes of the three-axis accelerometer.

According to an embodiment option, the vehicle is determined by use of the measurements.

According to an embodiment, the road condition characterization is displayed on a road map which preferably is by use of a smartphone or a computer system.

BRIEF DESCRIPTION OF THE DRAWINGS

Other features and advantages of the method according to the invention will be clear from reading the description hereafter of embodiments given by way of non-limitative example, with reference to the accompanying figures wherein:

FIG. 1 illustrates the steps of the method according to a first embodiment of the invention;

FIG. 2 illustrates the steps of the method according to a second embodiment of the invention;

FIG. 3 illustrates the steps of the method according to a third embodiment of the invention;

FIG. 4 illustrates distribution functions and probability density functions of the vertical acceleration measurements for various road sections;

FIG. 5 illustrates a graph of two routes having one common section;

FIG. 6 illustrates a graph of two routes having two common sections; and

FIG. 7 illustrates a graph of five routes having common sections.

DETAILED DESCRIPTION OF THE INVENTION

The present invention relates to a method of characterizing the condition of a road for a route travelled by at least one road user. The road condition, also referred to as road quality, is representative of the roughness of the road that may be due to degradations such as holes, potholes, bumps, etc., or to the construction of the road: paving stones, road markings, etc. According to the invention, the characterization method can determine a parameter representative of the road condition. For example, it may be a rating defined in such a way that, if the rating is high, the road has a high roughness level (bad quality road) and if the rating is low, the road has a low roughness level (good quality road).

A road user is understood to be a user of a vehicle circulating on the road. It may notably be a bicycle, a motor vehicle, a motorized two-wheeler or any other similar type of transport.

The method according to the invention uses two sensors: a three-axis accelerometer (that is a sensor measuring acceleration in three orthogonal directions) and a geolocation sensor such as a satellite-based positioning sensor, for example the GPS system (Global Positioning System), the Galileo system, etc. The three-axis accelerometer allows measuring the user's vertical acceleration (this vertical acceleration being related to the road condition), whatever the position of the accelerometer. The geolocation sensor allows determination of the road user's position and speed, in order to determine the location of the acceleration measurement. These two sensors afford the advantage of being well known, inexpensive and simple to implement. Preferably, the method according to the invention uses only these two sensors: a three-axis accelerometer and a geolocation sensor.

The geolocation sensor and the three-axis accelerometer can advantageously be included in a mobile phone of a smartphone. It is thus possible to perform measurements in a simple manner with a large number of users. Indeed, almost all smartphones are equipped with these two sensors. Furthermore, using a smartphone allows achieving characterization of the road condition independently of the vehicle, for all types of vehicle used by the road user and in particular for a bicycle.

According to the invention, the road condition characterization method comprises the following steps:
1) Acceleration, position and speed measurement
2) Vibration determination
3) Road condition characterization These steps can be implemented by computer. According to an example embodiment, step 1) can be carried out by a smartphone, and steps 2) and 3) can be carried out by a computer system comprising a server, which can be in a cloud. The smartphone then communicates with the server. This configuration allows overcoming the constraints related to the low computing power of smartphones. The steps are detailed in the description hereafter.

Step 1) is carried out continuously along the road user's route. Steps 2 and 3) can be preferably carried out after completion of the route by the road user.

FIG. 1 schematically illustrates, by way of non-limitative example, the steps of the method according to a first embodiment of the invention. A three-axis accelerometer ACC and a geolocation sensor GPS are used to perform the road user's acceleration, position and speed measurements MES. The vibrations generated by the road roughness are then determined, by disregarding AFF, for the acceleration measurements, the effect of the user's travel speed, the speed being that measured by the geolocation sensor. The determined vibrations are subsequently used to characterize the road condition CAR.

According to an embodiment of the invention, the road condition characterization method can comprise the following steps:
1) Acceleration, position and speed measurement
2a) Determination of vehicle user type
2) Vibration determination
3) Road condition characterization
4) Display of road condition characterization These steps can be implemented by computer. According to an example embodiment, steps 1) and 2a) can be carried out by a smartphone, and steps 2) and 3) can be carried out by a computer system comprising a server, which can be in a cloud. This configuration allows overcoming the constraints related to the low computing power of smartphones. The steps are detailed in the description hereafter.

Step 1) is carried out continuously during the road user's route. Steps 2 to 4) can be preferably carried out after completion of the route by the road user.

Steps 2a) and 4) are independent and therefore, only one of these steps can be implemented in a variant embodiment of the invention.

FIG. 2 schematically illustrates, by way of non-limitative example, the steps of the method according to an embodiment of the invention. A three-axis accelerometer ACC and a geolocation sensor GPS are used to perform the road user's acceleration, position and speed measurements MES. These measurements are performed on a smartphone TEL. The vibrations generated by the road roughness are then determined, by disregarding AFF, for the acceleration measurements, the effect of the user's travel speed, the speed being measured (and optionally processed) by the geolocation sensor. This step uses information relative to the type of vehicle used by the road user, for example: bicycle, motor vehicle or two-wheeler. The determined vibrations thus are subsequently used to characterize the road condition CAR. These steps are implemented on a server SER communicating with the smartphone. This road characterization is then displayed ECR, on a screen for example.

According to an embodiment of the invention, the road condition characterization method can comprise the following steps:
1) Acceleration, position and speed measurement
2a) Determination of vehicle user type
2b) Measurement storage
2) Vibration determination
3) Road condition characterization
4) Display of road condition characterization These steps can be implemented by computer. According to an example embodiment, steps 1), 2a) and 2b) can be carried out by a smartphone, and steps 2) and 3) can be carried out by a computer system comprising a server, which can be in a cloud. This configuration allows overcoming the constraints related to the low computing power of smartphones. The steps are detailed in the description hereafter.

Steps 2a), 2b) and 4) are independent and therefore, only one of these steps or any combination of these steps can be implemented in a variant embodiment of the invention.

Step 1) is carried out continuously during the road user's route. Steps 2 to 4) can be preferably carried out after completion of the route by the road user.

Step 3a) is particularly suitable when it is desired to characterize the road condition for at least one of routes and road users.

FIG. 3 schematically illustrates, by way of non-limitative example, the steps of the method according to an embodiment of the invention. A three-axis accelerometer ACC and a geolocation sensor GPS are used to perform the road user's acceleration, position and speed measurements MES. These measurements are performed on a smartphone TEL. The vibrations determined are stored STO in a storage. The vibrations generated by the road roughness are then determined, by disregarding AFF, for the acceleration measurements, the effect of the user's travel speed with the speed being that measured by the geolocation sensor. This step uses information relative to the type of vehicle used by the road user TYP, for example: bicycle, motor vehicle or two-wheeler. The information relative to the road user's vehicle TYP can also be stored STO in a storage. The determined vibrations for one or more routes are subsequently used to characterize the road condition CAR. These steps are implemented on a server SER communicating with the smartphone. This road characterization is then displayed ECR, on a screen for example.

1) Acceleration, Position and Speed Measurement

In this step, along the route, the road user's acceleration is measured by the three-axis accelerometer, and the road user's position and speed are measured by the geolocation sensor.

For the embodiment where the three-axis accelerometer is integrated in a smartphone, the smartphone vibrations generated by a poor-quality roadway can comprise components of higher frequency than the sampling frequency of the sensor (accelerometer). Besides, this sampling frequency can depend on the smartphone model. Furthermore, it can generally be fluctuating. Depending on the telephone type, the measurements can be frequently saturated.

According to a non-limitative example, the sampling frequency of the accelerometer can range between 100 Hz and 500 Hz.

Sampling of the acceleration measurements can be seen as a succession of independent random variable realizations identically distributed over windows of the order of 0.1 s. All of the information contained in these realizations is synthesized by the empirical joint distribution function of these three random variables.

By way of example, FIG. 4 shows the empirical distribution functions R of the one-dimensional acceleration measurements $a_z$, projected onto a vertical axis z, and the associated probability densities D for three road sections C1, C2, C3 characterized by different road conditions.

Road section C1 has a continuous distribution function centered around a median 9.2, which substantially corresponds to the acceleration of gravity 9.8 m/s². Section C1 exhibits a good road condition.

Road section C2 corresponds to a situation where the road user undergoes more vibrations, to the extent that 13% of the measurements are equal to 20 m/s², i.e. the saturation of the three-axis accelerometer for example.

Road section C3 is extremely chaotic: the sensor is saturated over 46% of the measurements.

The more irregular the road surface, the more the measurement distribution is dispersed around the central value corresponding to the acceleration of gravity 9.8 m/s². The standard deviation of the distribution then allows this distribution to be characterized.

2a) Determination of Vehicle User Type

This optional step determines the type of vehicle used by the road user, for example: a bicycle, a motor vehicle or a motorized two-wheeler, or any similar means. This step improves the vibration determination step according to the user type, to optimize road characterization.

This determination can be performed manually: such as by information provided by the user.

Alternatively, the method can automatically determine the road user's vehicle type, by analysing the speed and the movement of the vehicle.

According to an example embodiment, determination of the road user's vehicle type can be done on or by a smartphone, and sent to a server storing this information and carrying out the next steps.

2b) Measurement Storage

This optional step stores the accelerometer measurements and their geolocation in a database of a computer system, without identification of the vertical position of the sensors (and, when appropriate, of the smartphone). According to an example embodiment, this database can be stored in a smartphone, possibly the one that carries out steps 1) and 2).

The stored data can then be sent by mobile communication to a server that carries out steps 2) and 3) (and optionally 4)).

According to an embodiment of the invention, the measurements can be stored by measurement aggregation for a predetermined time window. This predetermined time window can range between 0.05 s and 0.25 s, and it is preferably 0.1 s, that is at a frequency ranging between 4 Hz and 20 Hz, which preferably is 10 Hz. The data aggregated in this predetermined time window can comprise at least one component which is average position information of the three acceleration measurement averages on the three axes of the accelerometer, and vibration information of the sum of the three variances of the acceleration measurement on the three axes of the accelerometer. In the predetermined time window, the vibration information is almost insensitive to the user's movements, so that here reference may be to isotropic measurements (independence of the road condition determination and of the three-axis accelerometer position). In particular, this criterion is relatively unaffected by the accelerometer saturation, thus making determination of the road condition robust and reliable, for any type of road user, especially cyclists. Furthermore, the simplicity of the method allows data aggregation to be made robust by limiting the impact of the unpredictable aspects of the execution thereof by a smartphone (for example: smartphone processor temporality problem, writing and reading of the data packets sent to the server, etc.). This measurement aggregation in the predetermined time window also allows, if necessary, to limit the volume of data exchanged between the smartphone and the server.

2) Vibration Determination

This step determines the vibrations generated by the road roughness from the geolocation measurements. The effects related to the road user's travel speed are therefore disregarded. Thus, disregarding the effects of speed allows taking only the road user's normal travel conditions into account, which makes determination of the road condition reliable.

Indeed, the road user's speed has a strong influence on the intensity of the vibration criterion and it is not related to the road condition. The signal from the three-axis accelerometer is therefore processed in this step in order to have no variance change of speed to depend on the road condition only with this speed being measured by the geolocation sensor. Various processings (disregard method) can be implemented to carry out this step.

According to an aspect of the invention, disregarding the effects of speed can be different depending on the type of road user. Thus, disregarding the effects of steps is more suited to the road user type, which increases the road characterization precision.

According to a first variant, when the road user rides a bicycle, the vibrations can be determined by keeping the acceleration measurements for a predetermined speed range. For example, the predetermined speed range can be between 15 and 30 km/h, preferably between 16 and 26 km/h. In this narrow range, it is estimated that the influence of speed on the intensity of the measured vibrations can be neglected. This method further has the advantage of being easy to implement. Furthermore, elimination of the low speeds allows avoiding accounting for particular behaviors when riding bicycles slow such as for example to avoid stationary vehicles, to change lanes, to get on or off a sidewalk, to stop the bicycle, etc.

According to a second variant, when the road user drives a motor vehicle or a motorized two-wheeler, the vibrations can be determined by dividing the acceleration measurements by a baseline that is a function of the road user's speed. In other words, the logarithm of the speed baseline can be subtracted from the logarithm of the acceleration measurements. This baseline can be known according to the route(s) travelled by the road user. In other words, the baseline can be obtained by the road user's speed measurements. Indeed, for these types of road user, a function with two parameters can be constructed with speed and vibrations reproducing a vibration criterion that is constant under change of speed.

Road Condition Characterization

This step determines the road condition as a function of the determined vibrations. In other words, the vibrations determined in step 2) are representative of the condition of the road. Analysis and geolocation of the vibrations therefore allows deduction the condition of the road.

According to an aspect of the invention, the road condition can be a rating defined in such a way that, if the rating is high, the road has a high roughness level (bad quality road) and if the rating is low, the road has a low roughness level (good quality road). Advantageously, the rating characterizing the road condition can be assigned by comparing the vibrations determined in the previous step with at least one predetermined threshold value.

According to an embodiment, the road condition can be determined by road sections. A road section is understood to be a portion of a road between two consecutive intersections. This embodiment is particularly advantageous because the road condition is generally constant or substantially constant over a road section. A road condition can thus be determined precisely and rapidly.

Preferably, the road condition can be characterized for a road section by analysing the distribution of the determined vibrations in the previous step. The distribution of the determined vibrations can be advantageously compared with theoretical distributions to deduce the road condition therefrom. For example, the average of the distribution of the determined vibrations can be compared with at least one predetermined threshold value.

According to an embodiment, the road condition to be determined can be for one route travelled by one road user. This embodiment allows a road condition characterization with a minimum amount of measurements.

Alternatively, the road condition can be determined by repeating steps 1) to 3a) for at least one routes and road users. This embodiment allows characterizing the road condition with measurements, which allows the road condition to be characterized in a precise manner. And it allows in particular to put the various measurements on the same scale, as though it were a single route travelling all the road sections.

For this embodiment, the road condition can be characterized, for each common travelled section by combining the vibrations determined for the various routes. According to a feature of the invention, in order to achieve combining of the vibrations determined for the various routes, a step of calibrating the routes can be carried out. In this case, this calibration can be performed by solving a constrained optimization problem. For example, the cost function can correspond to the sum, weighted by the number of routes along the road sections and the length thereof, of the variances (between the routes) of the normalized qualities of these road sections.

According to an embodiment of the invention, the determined (for one or more routes) vibrations can also be used to determine the position of the road irregularities, such as potholes for example, by use of geolocation measurements. For this embodiment, when the road condition is characterized for plural routes, it is also possible to determine a parameter relative to the percentage of users who managed to avoid the irregularity. Thus, this parameter provides additional information to ensure road users safety and comfort.

In the rest of this part, an example of implementation of this step is described for the embodiment wherein the road condition is characterized from multiple routes and road users, for riding bicycles in this example.

The heterogeneity of the bicycles, cyclists, geolocation sensors, three-axis accelerometers and of the type of mechanical coupling connecting them (sensors on the handlebar, in the cyclist's pocket, in a bag, etc.) may not allow consideration the determined vibrations in an absolute manner with the distributions of the determined vibrations possibly differing between each route. In this case, an inter-route calibration step can be carried out. This calibration step is independent of the chronological order of travel over times during which the road condition does not vary much, in view to a similar weighting of the routes (close in time) and to a non-sequential calibration method. Preferably, the calibration of the routes can be a method of symmetric optimization in chronological order of travel of the routes. This optimization can be performed by use of a cost function (also referred to as objective function). The cost function allows defining a proportionality factor specific to each route. A symmetric optimization function is understood to be a function insensitive to the chronological order of the routes (close in time).

It is therefore assumed that, if a road user uses two road sections of equal quality during a single route, then the measurements are nearly identical (this assumption is experimentally verified if the sensors, especially the three-axis accelerometer, do not change position during the route). Under this assumption, the vibrations determined during a single route provide a partial order relation of the road section quality that is correct. It may be hypothesized that the measurements differ only by a proportionality factor specific to each route. Each section/route pair can be assigned a normalized quality criterion after obtaining these proportionality factors. These criteria expressed on the same scale can be averaged between routes and by road section. Even if the measurements are not strictly proportional between the routes, this simple approach is legitimate to obtain the partial order relation of the road section qualities. These proportionality factors are not absolute and can only be determined in relation to the measurements provided for other routes. Determining these proportionality factors allows the vibrations to be calibrated.

FIG. 5 shows an example of two routes A and B sharing the same road section T1. Route A is represented by a dotted line and route B by a dashed line. In this case, the two proportionality factors can be easily determined, so that the two routes provide the same quality measurement on road section T1. According to a non-limitative example, the average of the road quality of the sections can be defined as equal to 1. Under such conditions, the two factors exist and are unique.

FIG. 6 shows an example of two routes A and B sharing two road sections T1 and T2. Route A is represented by a dotted line and route B by a dashed line. In this case, equality of the measurements cannot be ensured (2 unknown proportionality factors for two equality constraints of the quality criteria of sections T1 and T2, and an average equality constraint equal to 1). Then a cost function can be minimized, whose optimization allows determination of a proportionality factor pair which is as coherent as possible.

FIG. 7 shows an example of 5 routes A, B, C, D, E sharing many road sections (among which sections T3 and T4). Route A is represented by a dotted line, route B by a dashed line, route C by a solid line, route D by a dash-dotted line and route E by an alternation of two dots and one dash. It may be a general configuration of part of a road network. For example, section T3 has been travelled by routes B, C and D, and section T4 has been travelled by routes A and C. A cost function (which may correspond to the sum, weighted by the number of routes travelling the road sections and by the length thereof, of the variances between the routes of the normalized qualities of these road sections) allows finding the proportionality factors of the measurements for each route and optimization being performed separately on each of the connected graphs (two disconnected graphs cannot influence one another during the cost function optimization process).

3) Display of Road Condition Characterization

This optional step displays the road condition on a road map. This display can involve a rating or a color code. A rating or a color code can possibly be associated with each travelled road section. The road condition can be displayed on-board the vehicle such as on the dashboard, on an autonomous mobile device such as a geolocation device (of GPS type), and a mobile phone (of smartphone type). It is also possible to display the road condition on a website that the driver can consult later, after driving. Furthermore, the characterized road condition can be shared with the public authorities (road maintenance manager for example) and public works companies Thus, the public authorities and the public works companies can determine the roads (or the road sections) requiring maintenance. In such a case of application, characterization of the road can be related to information on the traffic on this road, and this road traffic can be determined by use of the method according to the invention by determining the number of routes travelled on the road (or road section) considered.

According to an embodiment, the position of the road irregularities, such as potholes for example, can also be displayed on the road map.

Furthermore, the invention relates to a method of determining a route to be travelled by a user, for which the departure and arrival points are identified, by carrying out the following steps:
 a) characterizing the road condition by use of the method of characterizing the condition of a road according to any one of the above variants or variant combinations, for at least one past route; and
 b) determining a route to be travelled in order to go from the departure point to the arrival point, by minimizing travelling on road section having a high rating or, in other words, according to a predetermined threshold related to the road condition.

Step b) can also minimize other conventional criteria of navigation devices, such as travel time, distance travelled, energy consumed, etc.

For step b), a shortest path algorithm having weighting depending on the road condition can be used.

This method allows improvement of the road users' comfort and safety, and in particular in the case of a bicycle or a motorized two-wheeler.

The invention claimed is:

1. A method of characterizing condition of a road along a route travelled by a user of the road using a vehicle, by use of a three-axis accelerometer and a geolocation sensor, comprising steps of:
 a) measuring along the route, acceleration representing roughness of the route of the user of the road along three axes with the three-axis accelerometer, measuring position and speed of the user of the road by the geolocation sensor, and storing in a database a measurement aggregation in a predetermined time window, ranging between 0.05 s and 0.25 s, of the acceleration measurements including accelerations representing roughness of the route;

b) determining vibrations generated by roughness of the road including at least one vibration component corresponding to a sum of three variances of the acceleration measurements on the three axes of the three-axis accelerometer from the measurement aggregation in the predetermined time window, by disregarding from the acceleration measurements effects of travel speed of the user of the road by:

i) when the user of the road rides a bicycle, determining the vibrations by using the acceleration measurements for a predetermined speed range;

ii) when the user of the road rides a motor vehicle or a motorized two-wheeler, determining the vibrations by dividing the measured acceleration by a baseline that is a function of speed of the user of the road; and c) characterizing the condition of the road by an analysis of the determined vibrations.

2. A method of characterizing the condition of a road as claimed in claim 1, wherein the three-axis accelerometer and the geolocation sensor are integrated into a smartphone.

3. A method of characterizing the condition of a road as claimed in claim 1, wherein the predetermined speed range is between 15 and 30 km/h.

4. A method of characterizing the condition of a road as claimed in claim 3 wherein the predetermined speed range is between 16 and 26 km/h.

5. A method of characterizing the condition of a road as claimed in claim 1, wherein the baseline is obtained from measurements of the route travelled by the user of the road.

6. A method of characterizing the condition of a road as claimed in claim 1, wherein the road condition is characterized by road sections of the route.

7. A method of characterizing the condition of a road as claimed in claim 6, wherein the road condition is characterized by use of a distribution of use determined from vibrations on each road section of the route.

8. A method of characterizing the condition of a road as claimed in claim 6, wherein steps a) and b) are repeated for routes for users of the road, and for each common road section travelled, the road condition is characterized by combining of the determined vibrations for the routes.

9. A method of characterizing the condition of a road as claimed in claim 8, wherein combining of the determined vibrations is performed through calibration of the routes, by a method of symmetric optimization in chronological order of travel of the routes.

10. A method of characterizing the condition of a road as claimed in claim 1, wherein the vehicle is determined by the measurements.

11. A method of characterizing the condition of a road as claimed in claim 1, wherein the road condition characterization is displayed on a road map, a smartphone or a computer system.

* * * * *